United States Patent [19]

Bunnelle

[11] E Re. 30,836

[45] Reissued Dec. 29, 1981

[54] LIQUID-GAS SEPARATOR UNIT

[75] Inventor: Philip R. Bunnelle, Santa Clara, Calif.

[73] Assignee: Kobe, Inc., Huntington Park, Calif.

[21] Appl. No.: 143,883

[22] Filed: Apr. 25, 1980

Related U.S. Patent Documents

Reissue of:

[64] Patent No.: 3,887,342
Issued: Jun. 3, 1975
Appl. No.: 305,645
Filed: Nov. 10, 1972

[51] Int. Cl.[3] ..... B01D 19/00

[52] U.S. Cl. ..... 55/203; 55/406; 166/105.5; 417/313

[58] Field of Search ..... 166/265, 105.5, 201, 166/202; 55/199, 203, 401–409; 417/313; 415/121 A, 168

[56] References Cited

U.S. PATENT DOCUMENTS

| | | | |
|---|---|---|---|
| 646,378 | 3/1900 | Szamatolski . | |
| 851,254 | 4/1907 | Rothenbücher . | |
| 1,292,626 | 1/1919 | Martin . | |
| 1,348,390 | 8/1920 | Claus . | |
| 1,398,450 | 11/1921 | Tinney . | |
| 1,506,722 | 8/1924 | Yunker . | |
| 1,657,055 | 1/1928 | Woodcock . | |
| 1,832,445 | 11/1931 | Birman . | |
| 1,930,479 | 10/1933 | Jones | 196/19 |
| 2,067,590 | 1/1937 | Ayres | 233/13 |
| 2,256,659 | 9/1941 | Thrasher | 172/36 |
| 2,285,169 | 6/1942 | Pyle | 166/105.5 |
| 2,311,963 | 2/1943 | Pyle | 55/199 |
| 2,406,959 | 9/1946 | Millard | 103/87 |
| 2,422,956 | 6/1947 | Edwards | 103/113 |
| 2,509,173 | 5/1950 | Schreier et al. | 183/21 |
| 2,511,150 | 6/1950 | Edwards . | |
| 2,661,076 | 12/1953 | Walker | 183/34 |
| 2,704,658 | 3/1955 | Gordon . | |
| 2,761,393 | 9/1956 | Stefano et al. . | |
| 2,800,296 | 7/1957 | Hatch et al. | 253/32 |
| 2,811,110 | 10/1957 | Edwards . | |
| 2,887,959 | 5/1959 | Stefano et al. . | |
| 3,262,252 | 7/1966 | Ebner | 55/178 |
| 3,271,929 | 9/1966 | Bowden | 55/52 |
| 3,282,031 | 11/1966 | Vos et al. | 55/203 |
| 3,300,950 | 1/1967 | Carle | 415/53 |
| 3,440,800 | 4/1969 | Jaschin | 55/122 |
| 3,447,290 | 6/1969 | Flory | 55/322 |
| 3,470,912 | 10/1969 | Bydal . | |
| 3,470,913 | 10/1969 | Booy . | |
| 3,535,854 | 10/1970 | Taylor | 55/338 |
| 3,624,822 | 11/1971 | Carle et al. | 166/105.5 |
| 3,672,795 | 6/1972 | Arutunoff et al. | 417/424 |
| 3,693,329 | 9/1972 | Willis . | |
| 3,853,430 | 12/1974 | O'Rourke | 417/360 |
| 3,867,056 | 2/1975 | Carle | 415/53 |
| 4,126,406 | 11/1978 | Traylor | 417/373 |

FOREIGN PATENT DOCUMENTS

| | | |
|---|---|---|
| 621476 | 6/1961 | Canada . |
| 536356 | 10/1931 | Fed. Rep. of Germany . |
| 1025380 | 3/1958 | Fed. Rep. of Germany . |
| 1407936 | 1/1970 | Fed. Rep. of Germany . |
| 477830 | 2/1953 | Italy . |
| 831114 | 3/1960 | United Kingdom . |

*Primary Examiner*—Bernard Nozick
*Attorney, Agent, or Firm*—Christie, Parker & Hale

[57] ABSTRACT

A liquid-gas separator unit with superior performance characteristics is disclosed. The unit is characterized by a high liquid flow rate capacity at high as well as low accompanying gas flow rates, and efficient liquid-gas separation capability. The unit has a unique discharge plug element and a unique intake plug element that cooperate with a unique impeller means. Inlet/recirculation openings in the unit casing act to increase the liquid flow rate.

38 Claims, 10 Drawing Figures

FIG_2
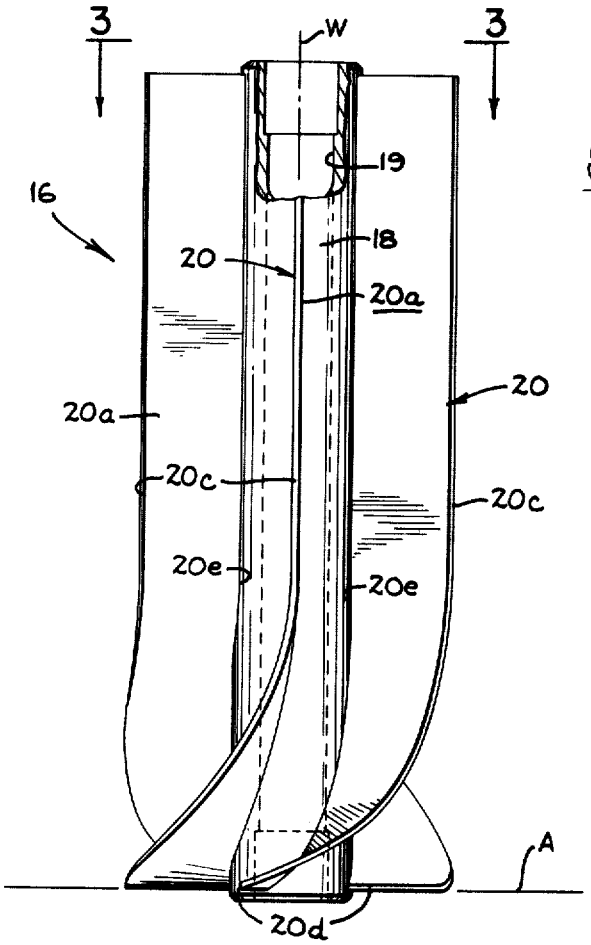
FIG_3
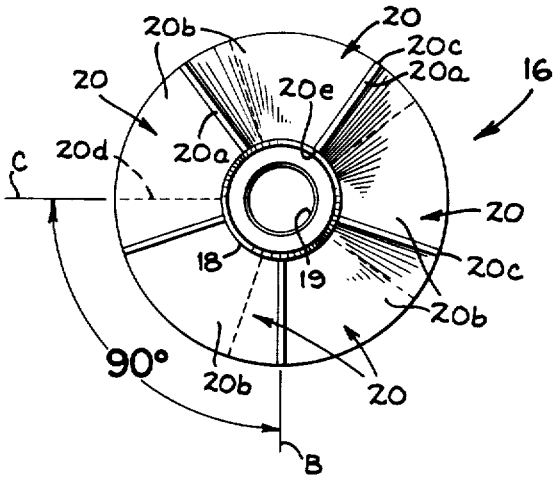
FIG_4
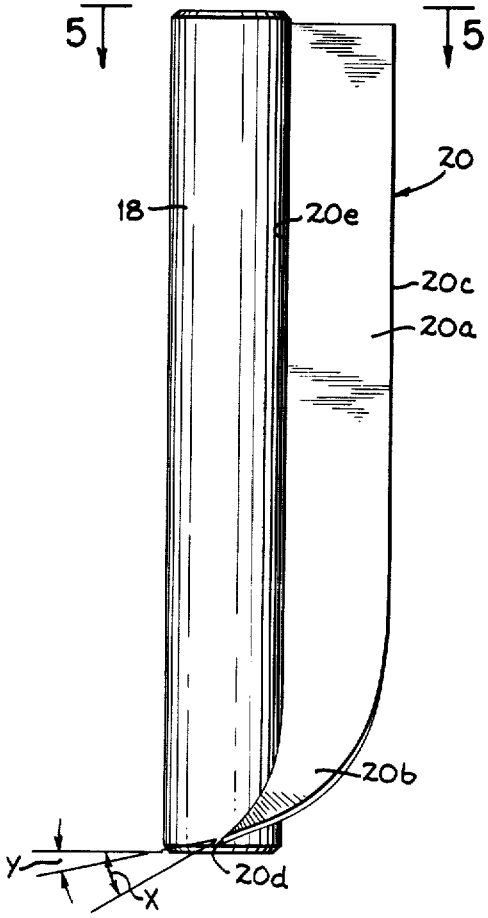
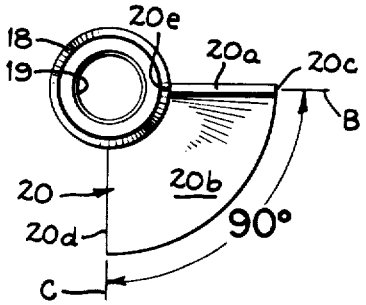
FIG_5

LIQUID-GAS SEPARATOR UNIT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to improvements in liquid-gas separator units that are adapted for use with downhole oil well pumps to separate gas from the liquid to be pumped from the well.

2. Description of the Prior Art

Liquid-gas separator units are used downhole in oil producing wells to perform the task of separating gas from well liquid before it is pumped out of the wells. Any significant amount of free gass present in undissolved form in an oil producing well hinders the pumping of the well liquid, which may include other liquids in addition to crude oil, out of the well. Various United States patents, such as U.S. Pat. No. 2,104,339 to Arutinoff, U.S. Pat. No. 2,311,963 to Pyle, U.S. Pat. No. 2,285,169 to Pyle and 3,624,822 to Carle, describe liquid-gas separator units and provide information as to why such units are used. As evidenced by these patents, there are different kinds of units that work according to different physical principles, and their performance characteristics, as might be expected, depend upon their particular features. There does not appear to be any particular unit, of which applicant is aware, that is not limited, in one way or another, in its performance capabilities.

A superior separator unit, in general, is one that is capable of discharging liquid at a high flow rate, after separating free or undissolved gas from the liquid, to provide relatively gas free liquid. Moreover, a superior liquid-gas separator unit can function to separate widely varying quantities of free gas, ranging from negligible gas flow rates constituting negligible proportions of a liquid flow rate up to large gas flow rates corresponding to several times the liquid flow rate, without any significant change (i.e., decrease) in the liquid flow rate through the unit and, in addition, can perform the separation function with essentially negligible gas carryover in the liquid discharged from the unit. Inherently, a high performance unit is one which efficiently separates gas from liquid and discharges liquid which has only a relatively small amount of undissolved gas remaining therein, because significant quantities of free gas in the discharged liquid may hinder efficient pumping of liquid form a well in which such a unit is utilized. A truly superior unit is capable of effective use in wells wherein large quantities of undissolved gas are present in the well liquid.

SUMMARY OF THE INVENTION

The goal of the present invention is to provide a liquid-gas separator unit having superior performance characteristics. In pursuit of this goal a unique separator unit, to be described, has been developed. The unit slightly resembles units shown in U.S. Pat Nos. 2,285,169 and 2,311,963 to H. C. Pyle, in that is has an impeller that rotates to effect liquid-gas separation by centrifuging a liquid-gas mixture.

A salient feature of the unit is a special impeller that has a lower portion that primarily serves to pump a liquid-gas mixture through the unit, and an upper portion that primarily serves to centrifuge the pumped mixture to separate gas and liquid before the separated gas and liquid are passed through respective passages of an adjacent discharge element. The impeller protions are comprised of specially shaped vanes. Other salient features of the unit include a unique discharge element, a unique intake element, and inlet/recirculation openings in the unit casing. The above features uniquely promote the goal of the invention.

In summary, the present invention provides a separator unit having an efficient combination of unique component parts tailored to produce improved results.

The nature of the present invention will become apparent upon review of the following detailed description taken in conjunction with the figures of the accompanying drawings.

BRIEF DESCRIPTION OF THE DRAWINGS

FIG. 2 is a side elevation with portions broken away showing a unique impeller used in the separator unit of FIG. 1.

FIG. 3 is an end view taken in the direction of arrows 3—3 of FIG. 2.

FIG. 4 is a side elevation showing fragment of the impeller of FIG. 2.

FIG. 5 is an end view taken in the direction of arrows 5—5 of FIG. 4.

DESCRIPTION OF THE PREFERRED EMBODIMENT

Figure 1:
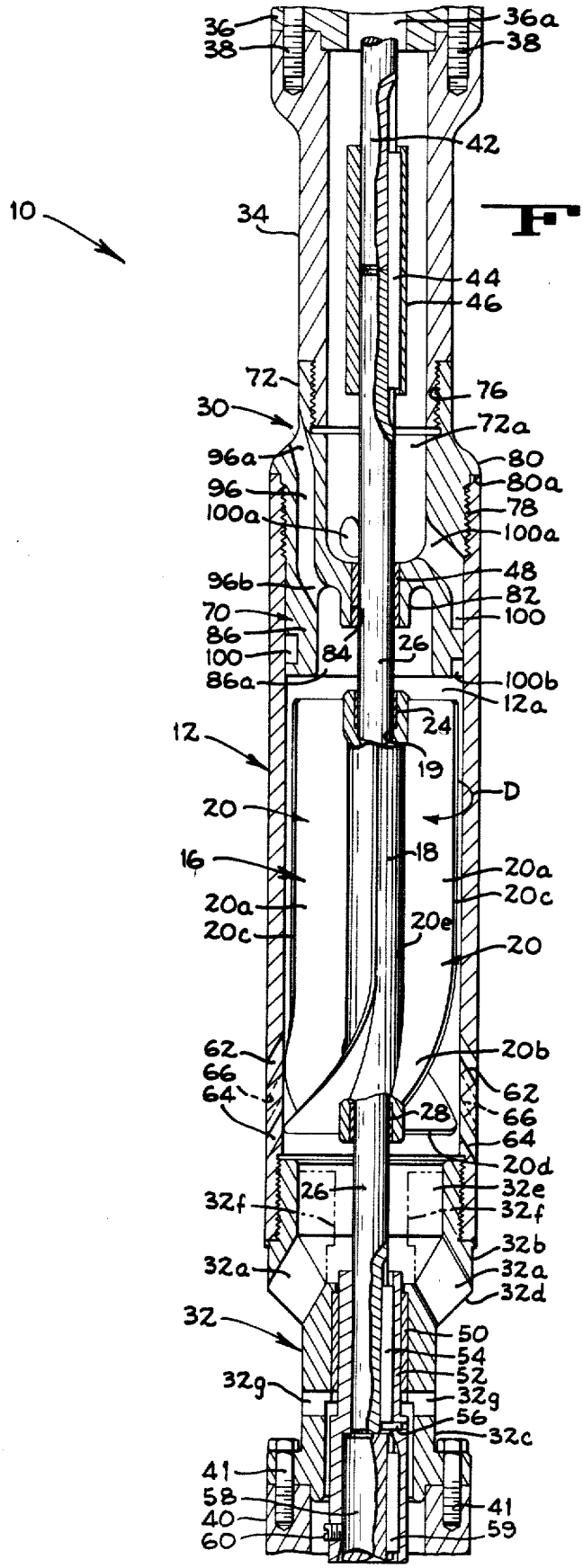
FIG. 1 is a central vertical section of a unique separator unit with other parts connected to it.
Figure 7:
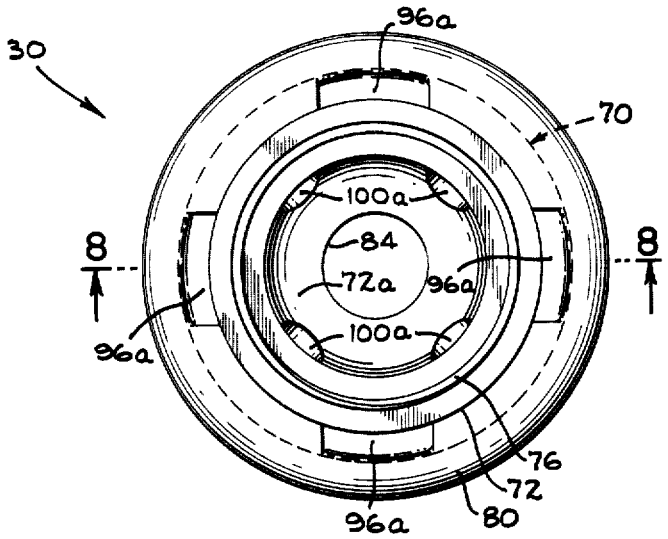
FIG. 7 is a plan view, taken in the direction of arrows 7—7 of FIG. 6, of the element shown in FIG. 6.

The separator unit 10 illustrated in FIG. 1 is comprised of a vertically disposed tubular casing 12 forming a cylindrical chamber 12a wherein a rotatable impeller 16 is disposed. Impeller 16 has a tubular hub 18 with a longitudinal bore 19 and a plurality of long, thin, narrow vanes 20. Hub 18 includes an upper counterbore wherein a corrugated ring sleeve 24 is press fitted between it and an impeller shaft 26, and further includes a lower counterbore containing a corrugated ring sleeve 28 press fitted between hub 18 and shaft 26. Sleeves 24 and 28 coact to affix impeller 16 to shaft 26.

A discharge plug element 30 is threaded into the internally threaded upper end of casing 12, and an intake plug element 32 is threaded into the internally threaded lower end of casing 12. Intake plug element 32 includes six intake openings or ports 32a that are uniformly circumferentially spaced about plug 32. Each port 32a slants upwardly (e.g., at an angle of about 60° with respect to a horizontal plane) toward the casing axis and is radially oriented. Intake element 32 further includes a relatively wide diameter tubular upper portion 32b with external threads for use in joining it to the lower end of casing 12, a relatively narrow diameter tubular lower portion 32c, and an intermediate tapered portion 32d wherein intake ports 32a are located. The body of element 32 defines an interior chamber 32e that communicates with the lowermost portion of casing chamber 12a.

Intake plug element 32 may be provided with a plurality of vanes that extend inwardly from the interior wall of the element's body toward the center of the chamber. For example, six vanes 32f, indicated by phantom lines in FIG. 1, may be added to element 32, and these vanes could be axially oriented, also as indicated in FIG. 1. These vanes could be located in equispaced relation about the interior body wall between the six intake ports 32a, and could be appropriately configured (i.e., straight, vertically elongated or helically curved) to interact with liquid-gas mixtures flowing through ports 32a toward impeller 16. Such vanes, if provided, could be used to alter and/or control the flow of liquid-gas mixtures upward through the chamber defined by the body of intake element 32 whereby a liquid-gas mixture flowing past them would impinge on the lower ends of the impeller vanes in such fashion as to set up an efficient mixture flow pattern.

The externally threaded lower end of a liquid conductor casing 34 is threaded into the internally threaded upper end of discharge element 30. The upper end of conductor casing 34 is fastened to the lower end of a pump casing 36 (constituting part of a pump stage, not shown) by screws 38 in the manner indicated in FIG. 1. The lower end of intake plug element 32 is screw fastened to the upper end of a motor casing 40 by screws 41 in the manner indicated in FIG. 1. The pump casing 36 confines conventional pump impellers (not shown) that are affixed to a pump shaft 42 having a lower end, which is shown in FIG. 1, that is axially coupled to impeller shaft 26. Shafts 42 and 26 are coupled together, so that they will rotate together, by a key pin 44 within aligned key slots in shafts 42 and 26 and a corresponding keyseat in a coupling sleeve 46. A coupling pin (not shown) fits within a transverse hole in shaft 42 and diametrically opposed transverse holes in sleeve 46, to secure the sleeve to the shaft.

Discharge plug element 30 has a central, vertical bore containing a sleeve brushing 48 affixed therein to provide a journal for a portion of shaft 26 that passes through the bushing. Intake plug element 32 has a bore, coaxial with the discharge plug element bore, with tubular bushing 50 that provides a journal for a corresponding portin of a shaft coupling 52. Shaft coupling 52 is connected to shaft 26 by a key pin 54 disposed within a keyway of shaft 26 and a keyseat of shaft 52. A retainer pin 56, securely fitted into a transverse bore in shaft coupling 52, protrudes radially into the lower end of the corresponding connecting shaft key slot to prevent the key pin 54 from falling out of the coupling 52. A coupling pin (not shown) fits within a transverse hole in impeller shaft 26 and diametrically opposed transverse holes in coupling 52 to affix the coupling to the shaft. Two diametrically opposed openings 32g are provided in element 32 to allow for the insertion of the pin into the holes of coupling 52 and shaft 26. The upper end of an electric motor shaft 58 is fitted into the lower end of shaft coupling 52 and secured thereto by a key pin 59 seated within a key slot of coupling 52 and a keyseat of shaft 58. A set screw 60 screw threaded into a transverse hole in coupling 52, extends into a radial opening in shaft 58 to fasten the coupling and shaft together.

The lower end of the separator casing 12 includes three vertically spaced circular rows of inlet/recirculation openings or ports that surround the lower end of impeller 16 in the illustrated unit 10. The topmost row comprises 24 openings 62 that are uniformly spaced about the casing. The lowermost row likewise comprises 24 openings 64 that also are uniformly spaced about the casing, with each opening 64 located axially below a respective opening 62. The intermediate row, i.e., between the aforesaid rows, similarly comprises 24 openings 66 that are uniformly spaced about the casing and staggered in relation to openings 62 and 64. Each opening 62, 64 and 66 is radially oriented and slants upward toward the casing's central axis.

Five impeller vanes 20 (FIGS. 2–5) are spaced uniformly at 72° intervals around the impeller hub 18, and these vanes extend lengthwise along the hub approximately its entire length. These vanes comprise straight, axially oriented strip segments 20a extending from the upper end of the hub down to spiral shaped strip segments 20b that extend to the hub's lower end. The vane segments 20a and 20b of each vane 20 merge in the lower half of the vane. The vanes have outermost edges 20c each located the same distance from the hub's axis. Each vane segment 20b curves spirally downward in a clockwise direction (as viewed from above) to terminate in a lowermost vane edge 20d that is disposed within a radial plane A (FIG. 2) taken perpendicular to the impeller's vertical axis W. Each straight vane segment 20a is disposed within an axial plane B (FIG. 3) taken through the impeller's vertical axis. Thus it is understood that the planes A and B are normal to each other. As seen in FIG. 3, each vane edge 20d is also disposed in an axial plane C (FIG. 3) located 90° clockwise from the axial plane B wherein the segment 20a of the same vane is disposed.

In operation, impeller 16 is caused to revolve in a clockwise direction i.e., in the direction indicated by the arrow D in FIG. 1. The impeller vanes 20 act to develop a high pressure head in the chamber 12a below discharge element 30. Since each vane segment 20b spirals 90° downward from an axially oriented vane segment 20a to an axially oriented edge 20d the slope angle X (see FIG. 4) at the vane's radially inner edge 20e is greater than the slope angle Y at the vane's radially outer edge 20d. In the example, the angle Y (see FIG. 4) is about 12° while the angle X is about 30°.

The discharge plug element 30, illustrated in FIGS. 6–10, is comprised of a generally cylindrical body 70, including an upstanding tubular lip 72 forming a liquid receiving chamber 72a at its upper end that conducts liquid coming from passages 100 upward into the liquid conductor casing 34. Lip 72 has internal threads 76 (FIG. 8) used to screw together element 30 and conductor casing 34 in the manner shown in FIG. 1. Body 70 has outer threads 78 used to screw element 30 into the upper end of separator casing 12 as shown in FIG. 1. Body 70 includes a tapered flange-like body portion 80 forming an annular shoulder 80a that seats upon the upper end of casing 12 when element 30 is assembled with the casing. Body 70 has a central hub portion 82 forming a bore 84, concentric with the central vertical axis of body 70, that receives bushing 48 and impeller shaft 26 in the manner indicated in FIG. 1. Hub 82 merges with a tubular lip 86 forming a cylindrical gas collection chamber 86a.

Figure 9:
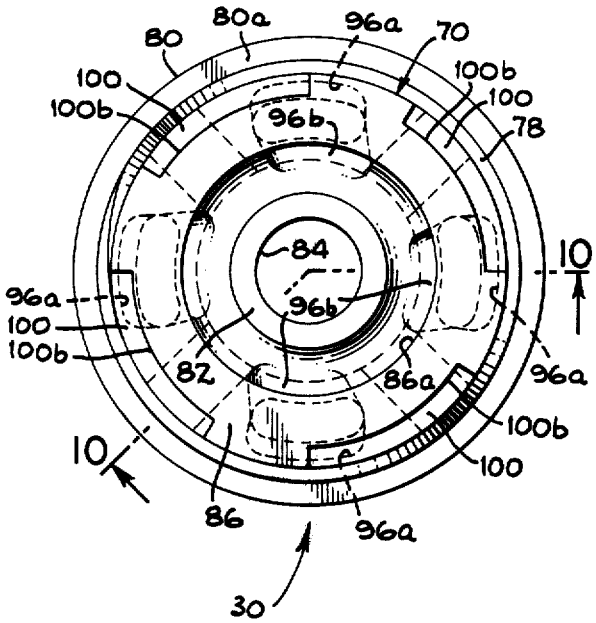
FIG. 9 is a bottom view of the element shown in FIG. 6.
Figure 10:
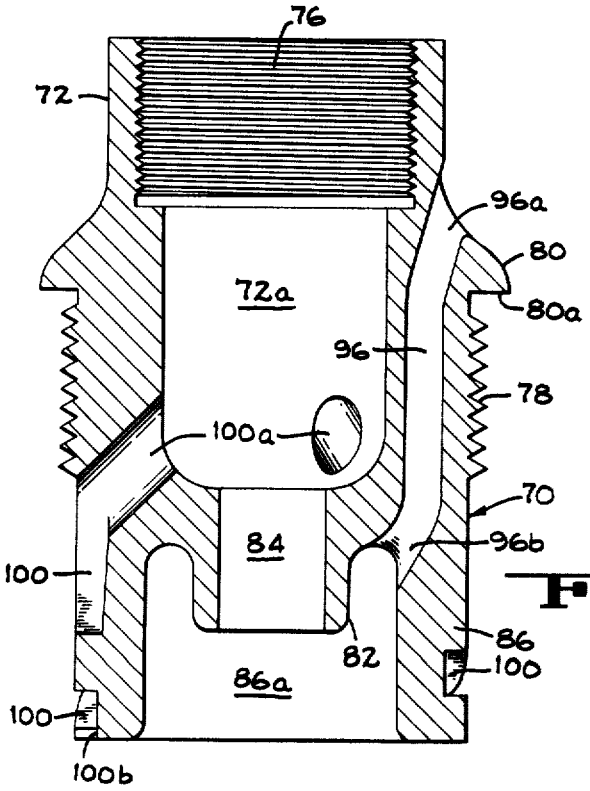
FIG. 10 is a central section taken along line 10—10 of FIG. 9.

As seen best in FIGS. 9 and 10, 70 has four internal gas channels or passages 96 symmetrically arranged about the body axis and leading upward from inlets 96b at the lower body chamber 86a to four respective passage outlets 96a spaced 90° apart on tapered body portion 80. Body 70 also has four symmetrically arranged exterior liquid channels, passageways, or slots 100 each of which spirals upward in a clockwise direction (as viewed from the upper end of element 30) from an inlet 100b at the lower end of element 30 to a respective outlet 100a communicating with upper body chamber 72a. The four outlets 100a are located at 90° intervals (see FIG. 7) with each outlet 100a offset 45° from adjacent interior ports 96a.

The configuration of body 70, the network of gas conveying passages 96 and liquid conveying passageways 100, and the proximity of body 70 to impeller 16 cooperate to facilitate the flow of liquid from impeller 16 to passageways 100 with minimum loss in the hydrokinetic energy of the liquid. Since body 70 lies immediately above impeller 16 and is vertically spaced therefrom by only a small vertical gap, the liquid flowing from the upper end of impeller 16 approaches inlets 100b with essentially the same flow velocity that it has as it spirals upwardly from the impeller. The body portion defining ports or inlets 96b of passages 96 is located above the ports or inlets 100b of passageways 100 and does not pose an obstacle to the flow of liquid into the passageways 100. The passages 96 and passageways 100 are arranged so that liquid can flow in an unobstructed path away from impeller 16 into the passageway inlets 100b without having to flow past a body portion containing passages 96. This arrangement is advantageous because the obstruction-free liquid flow path allows for substantial conservation of liquid hydrokinetic energy as liquid flows toward passageways 100.

In the illustrated embodiment of the invention all the passageways or channels 100 are identical. Each channel 100 (see FIG. 6) is defined by two slot walls 104 and 106 extending from the channel inlet 100b to the channel outlet 100a. Each channel 100 includes a lowermost upwardly sloping portion of small slope angle Z (20° with respect to a horizontal plane in the illustrated embodiment) merging with an uppermost, upwardly sloping channel portion whose slope angle varies and approaches 90° at the channel outlets 100a. The [slop] *slope* angle Z is such that liquid energy loss sustained in the liquid flowing from the impeller 16 into channels 100 is minimized. The width of at least a segment of the lowermost portion of each channel 100 increases with increasing distance from lower end 30a of element 30. The changing width of the channel segments provides an increase in channel area in the direction of liquid flow therethrough. Thus, in the illustrated embodiment, each channel 100 has straight wall portions 104a, 106a, extending between points P1, P2 and P3, P4 respectively, that diverge in the channel direction toward the associated uppermost channel portion which is of constant width. The lowermost channel portions are therefore widest at points P1 and P3 where the uppermost channel portions begin. In the illustrated discharge plug element 30, the wall portions 104a, 106a of each channel 100 diverge at an angle of 5° from a centerline L of the channel. Thus, the angular divergence between wall portions 104a, 106a is 10°.

OPERATION OF SEPARATOR UNIT 10

Separator unit 10 operates as follows. As motor shaft 58 revolves at a constant rate impeller shaft 26 and impeller 16 likewise revolve, whereupon impeller 16 draws a liquid-gas mixture through intake openings 32a, into the chamber 12a. As this liquid-gas mixture moves upwardly within chamber 12a, the revolving impeller vanes 20 impart a compound motion to it. Impeller vane segments 20b impell the mixture primarily upwardly through chamber 12a, while vane segments 20a primarily impart circular motion to the upwardly moving mixture, thereby centrifuging the liquid component of the mixture outwardly away from impeller hub 18 and causing undissolved gas present in the liquid to move inwardly toward hub 18. The separated liquid flows up through discharge channels 100 into discharge element chamber 72a. The separated gas forms a liquid-free gas column around hub 18, which column of gas moves upwardly into discharge element chamber 86a from whence the gas flows into inlets 96b and through gas conducting channels 96 to stream from gas discharge outlets 96a in nearly vertical, upward directions. The channel outlets 96a discharge discrete high velocity gas streams of separated gas that are substantially upwardly directed to promote upward movement of the discharged gas within a well bore (not shown) wherein unit 10 is situated.

Figure 6:
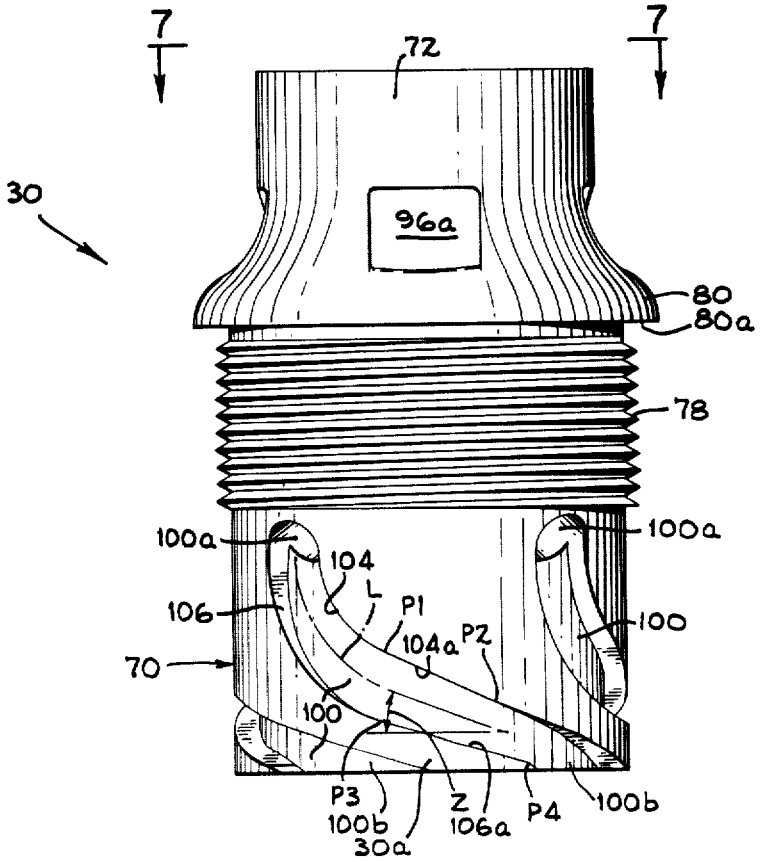
FIG. 6 is a side elevation of a unique discharge plug element used in the unit of FIG. 1.
Figure 8:
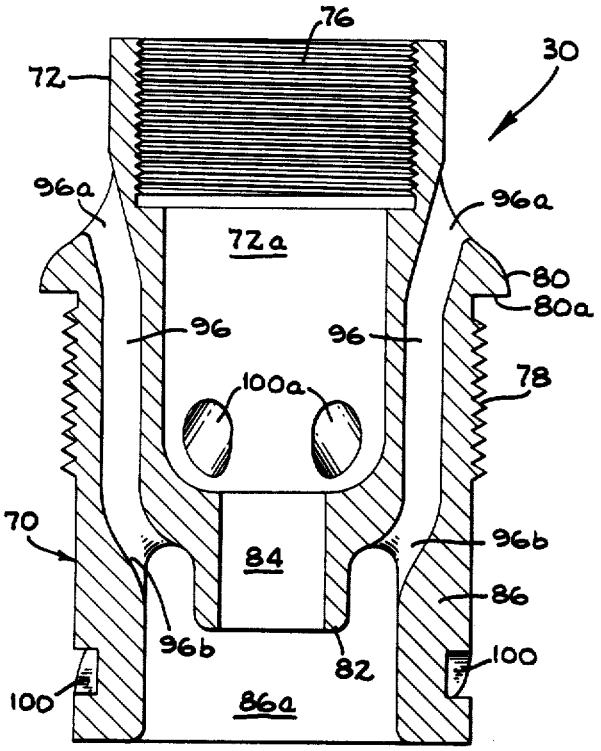
FIG. 8 is a central section taken along line 8—8 of FIG. 7.

The liquid entering the inlets 100b of channels 100 possesses both hydrostatic and hydrokinetic energy. The liquid flowing upwardly through channels 100 flows at a velocity that diminishes as the liquid flows along the tapered channel portions defined by wall portions 104a, 106a between points P1, P2, P3 and P4 (FIG. 6). The path of channels 100 is such that the liquid velocity is diminished within the channel segments extending between wall portions 104a, 106a before the liquid flows to and through the uppermost channel portions. The flow path promotes liquid flow through channel 100 with minimal liquid energy loss. As liquid flows through the tapered channel portion (between points P1, P2, P3 and P4 in the illustrated embodiment) of each channel 100, a portion of the liquid hydrokinetic energy, which is proportional to the square of the liquid velocity, is converted into hydrostatic energy thereby raising the hydrostatic pressure of the liquid delivered to the lower end of the pump casing 36. The lowermost portions of channels 100 are oriented at a slope angle Z (FIG. 6) to allow flow of upwardly spiralling liquid into channel inlets 100b without any substantial change occurring in the direction or velocity of liquid flow from the uppermost end of impeller 16.

The mixture inlet openings 32a (FIG. 1) of intake plug element 32 slope upward at an angle of about 60° (with respect to a horizontal plane) so that the liquid-gas mixture flows through them toward impeller 16 with little change in flow direction. The approximately vertical orientation of openings 32a, and the substantial intake area provided by them, facilitates transfer of a large quantity of mixture through the unit in a relatively short amount of time.

The inlet/recirculation openings 62, 64, 66 (FIG. 1) significantly increase the mixture flow rate through unit 10. During operation of unit 10 a hydrodynamic condition is established wherein liquid-gas mixture flows into chamber 12a through some of the openings 62, 64, 66 and flows out from chamber 12a through others; resulting in a net flow of liquid into chamber 12a. It should be understood, however, that the inlet/recirculation openings 62, 64, 66 are not essential to the operation of unit 10 and can be eliminated but they are provided because they extend the unit's liquid throughput capacity and reduce gas carryover with the discharged liquid. The lowermost openings 64 increase liquid throughput capacity at low gas rates (i.e., a liquid-gas mixture with a relatively small proportion of component gas), and the openings 62, 66 increase liquid throughput capacity at higher gas rates (i.e., a liquid-gas mixture with a relatively high proportion of component gas).

The described unit 10 possesses several advantageous performance characteristics. Liquid is discharged from unit 10 with a substantial pressure head due to the coaction of impeller 16 with the liquid conveying channels 100 of discharge element 30.

At the discharge element 30 the separated liquid enters liquid conveying channels 100 that act as diffuser passages wherein liquid velocity head is recovered, and wherein the liquid flow is turned in an upward axial direction prior to discharge from outlets 100a. Pressure recovery in discharge element channels 100 reduces the volume of any carryover gas entrained with separated liquid while providing a supercharging effect at inlet 36a (see FIG. 1) of pump casing 36. This supercharging improves the pumping action (i.e., raises the volumetric efficiency of the pump) and pressurizes the liquid at inlet 36a so as to reduce the likeihood that dissolved gas within the liquid will come out of solution and produce undesirable cavitation in the pump, which cavitation could impair the pump's action or cause physical damage to it. In channels 100 the reduction of liquid velocity is accomplished in the channel segments between portions 104a, 106a before any change in direction of this liquid stream occurs, reducing the friction loss associated with such changes in direction.

The ports or outlets 96a of gas conveying channels 96 are oriented to discharge upwardly directed discrete gas jets whereby, as is desirable, the likelihood of recirculation of the discharged gas to the intake openings 32a of intake element 32 is minimized. These gas jets assist in the upward expulsion of the discharge gas through the annular space between unit 10 and the well casing (not shown) to the top of the well where free gas escapes into a collection apparatus capping the upper end of the well bore. In this way, inefficient repetitive recirculation of discharged gas through unit 10 is minimized. Moreover, these gas jets create a minimal amount of turbulence in the well liquid outside unit 10 near gas discharge outlets 96a so that the tendency of discharged gas to become re-entrained with well liquid upon leaving outlets 96a is restricted. The increased annular area provided about discharge element body portion 80 between casing 34 and the surrounding well casing (not shown) permits any carryover liquid that might flow through passages 96 from chamber 86a to separate out of a supporting gas discharge jet and flow downward between the jets of gas issuing from passage outlets 96a toward intake element 32 without re-entraining gas. The unit 10 acts like a centrifugal pump in that the rate of discharge of liquid decreases with accompanying increases in hydrostatic pressure head and vice versa. The unit 10 will operate with a negative head (i.e., discharge pressure less than suction pressure).

The liquid-gas mixture enters chamber 12a due to the pumping action of impeller vane portions 20b, and the straight vane portions 20a whirl the mixture at high velocity. Impeller 16 accomplishes liquid-gas separation so effectively that there is little gas carryover with liquid even at high gas flow rates and low liquid discharge pressures, presumably because the depth of liquid near the wall of casing 12 is sufficient to completely fill the liquid-conveying channels 100 or because inward flow from channels 100 to chamber 72a via ports or outlets 100a tends to exclude gas from entering this chamber. Gas is discharged through gas discharge outlets 96a due to the hydrostatic pressure head provided by energy imparted by impeller 16 to the separated gas and/or by the pressure gradient which exists between intake element 32 and discharge element 30.

The unit 10, by providing a hydrostatic pressure head at liquid reservoir chamber 86a, reduces the tendency for cavitation to occur in the pump (not shown) operatively connected to unit 10. Also, since liquid velocity head is recovered in the channel segment defined by wall portions 104a, 106a of channels 100 the liquid pressure increases whereby the liquid discharged from such channel segments is at a pressure such that the liquid is not saturated with gas. It therefore is less likely that dissolved gas will be released from the liquid at points of reduced pressure downstream of the location defined by points P1-P3 of discharge element channels 100.

With no undissolved gas present in the liquid entering chamber 12a via intake element 32, liquid is discharged through gas-conveying passages 96. Whenever any amount of gas, however small, is present in the liquid entering chamber 12a a stable gas core, it is theorized, is formed with the impeller driven liquid forming a liquid ring or annulus around the core. The depth of this ring is self regulating, and is such that all the liquid is at a greater radius than the inlets 96b to the gas conveying passages 96. Consequently, as is rather amazing, with any small amount of gas present in the liquid entering chamber 12a via intake element 32 essentially no liquid discharges from gas discharge outlets 96a under an extremely wide range of liquid or gas flow rates. This characteristic is highly desirable since any liquid that does carryover into and through passages 96 recirculates down the outside of casing 12 toward intake element 32 and may, in doing so, re-entrain discharged gas in the process.

Preliminary laboratory tests of unit 10 have been conducted and, although lab tests can not fully duplicate actual use conditions, they indicated (1) that unit 10 effects a degree of liquid-gas separation that greatly exceeds the separation capability of existing units, (2) that unit 10 can, under test conditions, efficiently separate the liquid and gas components of a liquid-gas mixture and discharge large quantities of free gas and relatively gas free liquid at substantial flow rates, and (3) that unit 10 can, under test conditions, effect substantial separation of gas from a liquid-gas mixture that contains a high proportion of undissolved gas. The test results indicated that unit 10 possesses performance characteristics that surpass those of existing units.

During the tests the unit 10 and an existing unit were tested using the same test apparatus. The test data showed the way in which liquid flow rate through each unit varied with positive or negative pressure head. It was found that the pressure head or discharge pressure (measured in feet) generated by unit 10 greatly exceeded, by a large factor, the pressure head generated by the existing unit over a wide range of liquid flow rates (measured in gallons of liquid per minute). The discharge pressure is the pressure head generated by a unit. When gas free liquid was supplied to each unit it was found that the liquid flow rate through unit 10 greatly exceeded, by a large multiple factor, that of the existing unit for the same pressure head level. It was found that at zero discharge pressure the liquid flow rate through the existing unit was only about 17 gallons per minute while that through the unit 10 was about 82 gallons per minute. It was found that when the positive pressure head of the existing unit was equal to about 7 feet of water the liquid flow rate was zero gallons per minute. By comparison, when the positive pressure head of the unit 10 was equal to about 40 feet the liquid flow rate was about 30 gallons per minute.

Startling results were observed when comparative tests were carried out to determine the discharge pressure versus liquid flow rate curves of unit 10 and the existing unit when liquid-gas mixtures containing varying proportions of gas therein were supplied to the intake openings of the units. When as little as 0.55 cubic feet per minute of gas was introduced into the liquid going into the intake openings of the existing unit it was found that the unit's liquid flow rate reduced to zero gallons per minute. By comparison, it was found that when 26 cubic feet per minute of gas was introduced into the liquid going into the intake opneings 32a of unit 10 the liquid discharge rate exceeded 70 gallons per minute at zero feet of water of discharge pressure. Moreover, it was found that the discharge pressure versus liquid flow rate curve of unit 10 shifted only small amounts with increases in the amount of gas introduced into the liquid supplied to intake openings 32a up to large gas flows. More particularly, the liquid flow rate at a given pressure head decreased in small amounts with increases in the quantity of gas, measured in cubic feet per minute, entrained with the liquid going into unit 10. These measurements taken during the test clearly indicate the vast superiority of the unit 10 over the other unit that was tested.

The laboratory tests were conducted using air as the gas and water as the liquid, together with a surfactant to reduce surface tension of the water. The existing unit and the unit 10 effect separation of gas and liquid by using different principles. The unit 10 relies upon an impeller to achieve liquid gas separation, whereas the existing unit primarily relies upon a series of conventional separator cups to achieve liquid-gas separation. The existing unit is a duplicate of some units that have been used in recent years in numerous oil wells to separate out hydrocarbon and other gases from crude petroleum prior to pumping the petroleum (and any other liquids that may have been introduced into the subterranean formation containing a well to facilitate the petroleum recovery process). The existing unit is also typical of virtually all the units in recent years in this application in that they employ such separator cups. Since these units have been extensively used in oil producing wells it is believed that the laboratory tests have substantial validity in demonstrating the usefulness of the liquid-gas separation unit 10 for oil well applications. Although unit 10 is intended for use in oil well applications the tests clearly demonstrated that it can be used as a liquid-gas separator in other applications wherein liquid and gas other than petroleum and hydrocarbon gases are to be separated for a useful purpose.

Presumably the unit could be used to separate immiscible liquids of different densities.

The unit could be used as a pump or with pumps driven either by a line shaft or a submersible motor.

Although the best mode contemplated for carrying out the present invention has been herein shown and described, it will be apparent that modification and variation may be made without departing from what is regarded to the subject matter of the invention.

What is claimed is:

1. A liquid-gas separator unit comprising, in combination, means defining a chamber having first and second longitudinally spaced portions, impeller means disposed within the chamber between the first and second chamber portions, said impeller means including vanes configured to impart circular motion to liquid after first imparting upward motion to the liquid, means connected to the impeller means for rotating said impeller means, intake means communicating with the first chamber portion for admitting a liquid-gas mixture into said first chamber portion, discharge means communicating with the second chamber portion for discharging the liquid and gas components of the mixture from said second chamber portion after such components have been separated within the chamber by the rotation of the impeller means, said discharge means including passage means for conveying the gas component from the impeller means, said discharge means further including passageway means for conveying the liquid component from the impeller means without causing an abrupt change in the direction and velocity of the liquid component as it flows into the passageway means.

2. A liquid-gas separator unit comprising, in combination, means defining a separator chamber having first and second longitudinally spaced portions, impeller means rotatably disposed within the chamber between the first and second chamber portions, intake means communicating with the first chamber portion for admitting a liquid-gas mixture into said first chamber portion, discharge means communicating with the second chamber portion for discharging the liquid and gas components of the mixture from said second chamber portion after such components have been separated within the separator chamber by the rotation of the impeller means, said impeller means including impeller vanes with first portions to primarily move the mixture away from the first chamber portion upwardly toward the second chamber portion, said impeller vanes including second portions to primarily move the mixture in a circular flow path about the rotation axis of the impeller means, said first and second impeller vane portions having different configurations suited for imparting the above mentioned movement to the mixture.

3. A separator unit comprising, in combination, separator casing means, a discharge element closing the upper end of the casing means, an intake element closing the lower end of the casing means, a rotatable shaft extending through and journalled in the discharge element and the intake element, an impeller affixed to said shaft between the discharge element and the intake element, said impeller including long, narrow vanes configured to impart circular motion to liquid after first imparting upward motion to the liquid, the discharge element including channels that spiral upwardly in the same direction as the direction of impeller rotation, the lower ends of the channels being sloped to facilitate smooth flow of liquid from the upper ends of the vanes into the lower ends of channels, the upper ends of the channels leading to a central chamber area at the upper end of the discharge element, and a plurality of internal passages in said discharge element, each internal passage extending from a lower, central chamber in the lower end of the discharge element to the element's exterior to each provide an exhaust path to the exterior of the unit.

4. A separator unit, which can be utilized to separate gas from liquid, comprising, in combination, a vertically disposed gas separating chamber defined by a tubular casing or the like, intake means for admitting liquid that contains gas to the lower portion of said chamber, means to exhaust separated gas from the upper portion of the chamber, means to exhaust separated liquid from the upper portion of the chamber, and means to separate gas from liquid comprising (a) an elongated impeller adapted to rotate within the chamber, said impeller comprising a plurality of vertically disposed elongated impeller vanes each with an upper end and a lower end, each vane having a helical curvature near its lower end and having a substantially straight curvature near its upper end whereby the lower portions of the vanes coact to impell liquid with gas therein upwardly within the chamber and whereby the upper portions of the vanes coact to impell the liquid away from the center of the chamber whereby gas separates from the liquid and moves toward the center of the chamber.

5. The unit of claim 4 wherein the intake means has at least one intake opening that slopes upward toward the center of the chamber.

6. The unit of claim 4 wherein the means to exhaust liquid and gas is comprised of respective passage means for channelling separated gas and separated liquid out of the chamber through noninterconnected passageways, said discharge element including a liquid conveying passageway that is tapered to effect a decrease in liquid velocity as liquid flows along the passageway.

7. In a separator unit wherein the gas and liquid components of a liquid-gas mixture are separated the combination comprising, means defining a vertically oriented separation chamber, intake means communicating with the chamber for admitting a liquid-gas mixture into a lower portion of said chamber, discharge means communicating with the chamber for discharging separated gas and separated liquid from an upper portion of said chamber, impeller means disposed within the chamber and being rotatable about a vertical axis to impell the gas-liquid mixture in the chamber from the intake means toward the discharge means, the impeller means having upper and lower portions of different configuration that coact to centrifuge the liquid-gas mixture after impelling it upwardly within the chamber, the portions acting to cause the liquid component of the mixture to move away from the center of the chamber while also acting to cause the gas component of the mixture to move toward a central region of the chamber, the lower portion of the impeller means having means to primarily impell the liquid-gas mixture upwardly within the chamber, the upper portion of the impeller means having means to primarily impell the liquid-gas mixture into a circular orbit, the impeller means acting to impell relatively gas free liquid in an upwardly spiralling [oribt] *orbit* from the upper end of the impeller means into a liquid conveying passage in the discharge means while permitting gas, separated by the impeller means from the liquid, to rise from the central region of the chamber into a gas conveying passage in the discharge means.

8. The separator unit of claim 7 wherein the unit includes a plurality of liquid conveying passages.

9. The unit of claim 7 wherein the impeller means has a plurality of vanes which rotate about the aforesaid axis.

10. The separator unit of claim 7 wherein the lower end of the liquid conveying passage is below the lower end of the gas conveying passage.

11. The separator unit of claim 7 wherein the liquid conveying passage and the gas conveying passage are formed in a body defining the discharge means and wherein the gas conveying passage follows a path such that the upwardly spiraling liquid flows to the liquid conveying passage in an unobstructed flow path that is not obstructed by the portion of the body which defines the gas conveying passage.

12. The separator unit of claim 7 wherein the liquid conveying passage curves in an upward direction around the aforesaid axis to facilitate liquid flow from the upper end of the impeller means into the liquid conveying passage with little concomitant change in liquid flow direction.

13. The unit of claim 12 wherein the impeller means has a plurality of vertically oriented vanes which include upper and lower vane segments, the upper vane segments providing substantially axially oriented vane surfaces, the lower vane segments providing substantially helically oriented vane surfaces curving upward about the aforesaid axis in a circular direction opposite to the direction of upward curvature of the aforesaid curved liquid conveying passage of said discharge means.

14. The separator unit of claim 7 wherein the gas conveying passage leads upwardly to the outside of the unit to discharge gas from the unit in a generally upward direction.

15. The separator unit of claim 11 wherein the unit includes a plurality of gas conveying passages.

16. The unit of claim 7 wherein the chamber defining means includes opening defining means in the lower portion thereof approximate the lower portion of the impeller means, said opening defining means functioning as auxiliary inlet ports to increase liquid capacity of the separator unit.

17. The unit of claim 16 wherein the opening defining means is comprised of a plurality of discrete openings.

18. The unit of claim 17 wherein the discrete openings are oriented toward the center of the chamber.

19. The unit of claim 17 wherein the discrete openings slant upwardly toward the chamber.

20. The unit of claim 17 wherein the discrete openings are arranged symmetrically about the chamber.

21. The unit of claim 17 wherein the discrete openings are arranged into vertically spaced rows.

22. In a separator unit, the combination comprising: casing means defining a vertically oriented cylindrical chamber wherein an impeller means is operative to separate gas from a liquid gas mixture, a discharge element operably connected with the upper end of the casing means, the discharge element being located immediately above the impeller means, the discharge element comprising a body with upper and lower portions, the upper portion defining a central chamber serving as a liquid receiving chamber, the lower portion defining a central chamber serving as a gas collection chamber, a plurality of passageways leading upwardly through the body from the gas collection chamber to respective passageway ports, a plurality of passages leading upwardly in the body from its lower end to passage ports communicating with the liquid reservoir chamber.

23. *In a separator unit,* the combination [set forth in claim 22] *comprising: casing means defining a vertically oriented cylindrical chamber wherein an impeller means is operative to separate gas from a liquid gas mixture, a discharge element operably connected with the upper end of the casing means, the discharge element being located immediately above the impeller means, the discharge element comprising a body with upper and lower portions, the*

*upper portion defining a central chamber serving as a liquid receiving chamber, the lower portion defining a central chamber serving as a gas collection chamber, a plurality of passageways leading upwardly through the body from the gas collection chamber to respective passageway ports, and a plurality of passages leading upwardly in the body from its lower end to passage ports communicating with the liquid reservoir chamber,* wherein the passages curve upwardly in a substantially spiral path from the lower end of the body, whereby liquid can flow upwardly into the passages with little change in flow direction of the liquid.

24. The combination set forth in claim [22] *23* wherein each passageway port is adapted to discharge a stream of gas in a substantially upward direction.

25. A liquid-gas separator unit comprising, in combination, casing means defining a cylindrical chamber containing an impeller means which has a lowermost portion adapted to impell liquid upward through the chamber and which has an uppermost portion adapted to centrifuge the liquid, a discharge element connected to the uppermost portion of the casing means near the uppermost portion of the impeller means, an intake element connected to the lowermost portion of the casing means near the lowermost portion of the impeller means, a first discharge passage within the discharge element, the discharge passage sloping upward along a curved helical path, a second discharge passageway within the discharge element, the discharge passageway sloping upward from the lowermost portion of the discharge element to the exterior of the discharge element, at least one upwardly sloping intake opening in the intake element, whereby normal operation of the unit results in flow of a gas and liquid mixture through the intake opening into the chamber wherein the impeller means rotates to cause gas to separate from liquid and move toward the center of the chamber from whence the gas rises into and through the discharge passageway while the impeller means rotates to impart upwardly spiraling motion to the liquid causing it to flow from the uppermost portion of the impeller means along a flow path that is substantially in line with the spiral path of the first mentioned discharge passage so that the liquid flows with minimum change in flow direction into the discharge passage.

26. The unit of claim 25 wherein the casing means has opening means in its lowermost portion effective to increase the liquid throughput capacity characteristic of the unit.

27. The unit of claim 25 wherein the impeller means has a plurality of vanes each of which has an upper portion extending downwardly to a curved lower portion.

28. A liquid-gas separator unit comprising, in combination, a vertically oriented casing providing a cylindrical chamber, a discharge element connected to the upper end of the casing to provide a closure for the upper end of the chamber, said discharge element having gas and liquid outlets communicating with the chamber, an intake element connected to the lower end of the casing to provide a closure for the lower end of the chamber, an impeller within the chamber, said impeller including a plurality of vertically oriented vanes, said vanes being configured to define an upper impeller zone wherein the impeller vanes coact upon rotating to impell liquid away from the center of the chamber by centrifugal force, said vanes being configured to define a lower impeller zone wherein the impeller vanes coact upon rotating to impell liquid upward within the chamber, said discharge element including discharge channels that slope downwardly toward the impeller in respective curved paths.

29. The separator unit of claim 28 wherein the discharge channels include tapered segments that progressively increase in area with increasing distance from the impeller.

30. A separator unit, which may be utilized to separate gas from liquid, comprising, in combination, a vertically disposed casing forming a cylindrical chamber therein, a discharge plug connected to the upper end of the casing, an intake plug connected to the lower end of the casing, a shaft having portions that extend through the discharge plug and intake plug, an impeller secured to said shaft within said chamber between the discharge plug and intake plug, the impeller being rotatable to impell liquid through said chamber, the impeller including a lower portion adapted to impell liquid toward the discharge plug and including an upper portion adapted to impell liquid away from the center of the chamber, rotation of the impeller being effective to separate gas from liquid causing gas to move toward the center of the chamber from whence separated gas flows through a passage of the discharge plug, the liquid being impelled by the impeller into and through a passageway of the discharge plug.

31. The unit of claim 30 wherein the discharge plug includes a plurality of liquid conveying passageways that are symmetrically arranged to promote uniform liquid flow through the discharge plug.

32. The unit of claim 30 wherein the discharge plug includes a tubular upper portion that provides a chamber that opens upwardly and wherein the passageway communicates with the chamber.

33. A separator unit, that may be utilized to separate gas from liquid, comprising, in combination, a vertically disposed casing forming a cylindrical chamber therein; a discharge element connected with the upper end of the casing to provide a closure for the top end of the chamber, to provide a discharge passage for conducting separated liquid from the chamber, and to provide an exhaust passage for conducting separated gas from the chamber; an impeller disposed within the chamber and secured to a shaft that extends through the discharge element and through an intake element that is connected with the lower end of the casing to provide a closure for the bottom end of the chamber and to provide an inlet passage for admitting liquid and gas into the chamber, said impeller including a plurality of vertically oriented elongated vanes each of which has a vertically elongated segment that merges with a spiral segment that extends to the lower end of the vane.

34. The unit of claim 33 wherein the casing includes opening means providing communication between the chamber and the outside of the casing.

35. The unit of claim 33 wherein the casing includes multiple opening means for allowing flow of liquid through some of the opening means into the chamber and for allowing flow of liquid through some of the opening means out of the chamber.

36. The unit of claim 33 wherein the discharge element includes a central gas collection chamber that opens downward toward the impeller, the exhaust passage extending from the collection chamber with which it communicates to the outside of the unit.

37. The unit of claim 33 wherein the discharge passage curves upward from the lower end of the discharge element along a path that includes a spiral segment and communicates with an upper portion of the discharge element from whence liquid can be conveyed.

38. In a separator unit that can be used to separate gas from liquid, a discharge plug connected to the upper end of a separator unit casing to provide a closure for the top end of a chamber, the plug including a central vertical bore in which an impeller shaft is journalled, a downwardly opening gas collection chamber at the lower end of the plug, a gas conveying passage extending from the gas collection chamber upwardly to the outside of the plug, a liquid conveying passage provided on said plug which passage spirals upwardly to permit easy flow of upwardly spiralling liquid into and through the passage to the top end of the plug, and impeller means to impart spiral and upward movement of liquid, and separation of gas from said liquid, in said separator unit.

* * * * *

UNITED STATES PATENT AND TRADEMARK OFFICE

CERTIFICATE OF CORRECTION

PATENT NO. : RE 30,836

DATED : December 29, 1981

INVENTOR(S) : Philip R. Bunnelle

It is certified that error appears in the above—identified patent and that said Letters Patent is hereby corrected as shown below:

Column 12, line 45, Cancel Claim 22.

On the title page, "38 Claims" should read -- 37 Claims --.

Signed and Sealed this

*Third* Day of *August 1982*

[SEAL]

*Attest:*

GERALD J. MOSSINGHOFF

*Attesting Officer*

*Commissioner of Patents and Trademarks*